United States Patent
Chen

(10) Patent No.: US 6,227,600 B1
(45) Date of Patent: May 8, 2001

(54) SUN VISOR

(76) Inventor: Wen-Ho Chen, No. 198, Hsishih Rd., Yungkang City, Tainan Hsien (TW)

( * ) Notice: Subject to any disclaimer, the term of this patent is extended or adjusted under 35 U.S.C. 154(b) by 0 days.

(21) Appl. No.: 09/379,980

(22) Filed: Aug. 24, 1999

(51) Int. Cl.$^7$ .................................................... B60J 3/60
(52) U.S. Cl. ...................... 296/97.2; 296/97.7; 296/97.8
(58) Field of Search ................... 296/97.7, 97.8, 296/97.2

(56) References Cited

U.S. PATENT DOCUMENTS

| | | | | |
|---|---|---|---|---|
| D. 302,107 | * | 7/1989 | Adams | 296/97.7 |
| 1,493,767 | * | 5/1924 | Reimer | 296/97.7 |
| 4,607,875 | * | 8/1986 | MCGirr | 296/97.7 |
| 4,762,358 | * | 8/1988 | Levosky et al. | 296/97.7 |
| 5,024,479 | * | 6/1991 | Bryngelson | 296/97.7 |
| 5,064,238 | * | 11/1991 | Mohtasham | 296/97.7 |
| 5,098,149 | * | 3/1992 | Lee | 296/97.8 |
| 5,314,226 | * | 5/1994 | Tover | 296/97.7 |
| 5,344,206 | * | 9/1994 | Middleton | 296/97.7 |
| 5,494,328 | * | 2/1996 | Lehr | 296/97.7 |
| 5,495,884 | * | 3/1996 | Shikler | 296/97.8 |
| 5,570,734 | * | 11/1996 | Wu | 296/97.7 |
| 5,653,277 | * | 8/1997 | Kerner et al. | 296/97.8 |
| 5,845,956 | * | 12/1998 | Yang | 296/97.8 |
| 5,992,498 | * | 11/1999 | Boston | 296/97.7 |

FOREIGN PATENT DOCUMENTS

| | | | | |
|---|---|---|---|---|
| 0658642 | * | 7/1965 | (BE) | 296/97.7 |
| 0932359 | * | 8/1973 | (CA) | 296/97.7 |
| 0907745 | * | 3/1954 | (DE) | 296/97.7 |
| 30008047 | * | 9/1981 | (DE) | 296/97.7 |
| 0687019 | * | 8/1930 | (FR) | 296/97.7 |
| 0973892 | * | 2/1951 | (FR) | 296/97.7 |
| 1348476 | * | 12/1963 | (FR) | 296/97.7 |
| 0014314 | * | 9/1916 | (GB) | 296/97.7 |
| 0244277 | * | 12/1925 | (GB) | 296/97.7 |
| 0360640 | * | 11/1938 | (IT) | 296/97.7 |
| 0517956 | * | 9/1956 | (IT) | 296/97.7 |

* cited by examiner

Primary Examiner—Joseph D. Pape
Assistant Examiner—Kiran B. Patel
(74) Attorney, Agent, or Firm—Dorsey & Whitney LLP

(57) ABSTRACT

An improved sun visor with a sucker and a Velcro tab is disclosed. The sun visor comprises a reel having a curtain extensively received within the reel. The curtain has a channel along through the bottom thereof and a notch defined in the channel. The sucker and the Velcro tab are located in the notch. The Velcro tab includes an adhesive tape formed on a first face and a hole defined therein. The sucker comprises a suction cup, a protrusion formed on the back of the suction cup, and an aperture defined in the protrusion. The protrusion is inserted into the hole of the Velcro tab via the first tab. A bar is inserted through the channel of the curtain and the aperture of the sucker. The sucker pivots about the bar enabling a user to select the sucker or the Velcro tab to retain the curtain at a desired position.

2 Claims, 6 Drawing Sheets

SUN VISOR

BACKGROUND OF THE INVENTION

1. Field of the Invention

The present invention relates to an improved sun visor, and more particularly to a sun visor which can be selected to fix a curtain on a windshield by a sucker or a VELCRO® hook and loop.

2. Description of Related Art

A sun visor is a device provided on a car's windshield to keep out the sunshine. A conventional sun visor has a curtain received within a reel. In use, the curtain can be extended to cover the windshield. A sucker is provided at the bottom of the curtain for fixing it on the windshield. However, sometimes the sucker easily falls off the windshield. Therefore, the sun visor further comprises a VELCRO® hook and loop tab provided at the bottom of the curtain. The user can fix the curtain in a desired position by the attaching the Velcro tab to a second Velcro tab.

As shown in FIG. 5, the conventional sun visor comprises a curtain (80) received within a reel (not numbered). A VELCRO® hook and loop tab (81) is provided at the bottom of the curtain (80) and has a hole (82) defined therein. A sucker (83) is provided in the hole (82). The adhesive surface of the Velcro tab (81) and the sucker (83) both face the windshield.

Referring to FIG. 6, when a user wants to fix the curtain (80) in position by using the VELCRO® hook and loop tab (81), it is very inconvenient to adhere the VELCRO® hook and loop tab (81) to the bottom of the windshield because the sucker (83) is located between the curtain (80) and the windshield. Thus, the user often detaches the sucker (83) and only uses the VELCRO® hook and loop tab (81). However, during long term use the VELCRO® hook and loop tab (81) gradually loses its retention property and the user may want to switch to using the sucker (83) for retaining the curtain (80) again, but it is possible that the sucker (83) has been lost and there is noeffective way to fix the curtain (80).

Therefore, it is an objective of the invention to provide an improved sun visor to mitigate and/or obviate the aforementioned problems.

SUMMARY OF THE INVENTION

The main object of the present invention is to provide an improved sun visor with a sucker and a VELCRO® hook and loop tab, wherein the sucker and the VELCRO® hook and loop tab can respectively face the windshield to fix a curtain on it.

Another object of the present invention is to provide an improved sun visor with a sucker and a VELCRO® hook and loop tab such that when the curtain is retained in position by using the VELCRO® hook and loop tab, the sucker need not be detached and will not be lost.

Other objects, advantages and novel features of the invention will become more apparent from the following detailed description when taken in conjunction with the accompanying drawings.

DETAILED DESCRIPTION OF PREFERRED EMBODIMENT

Figure 1:
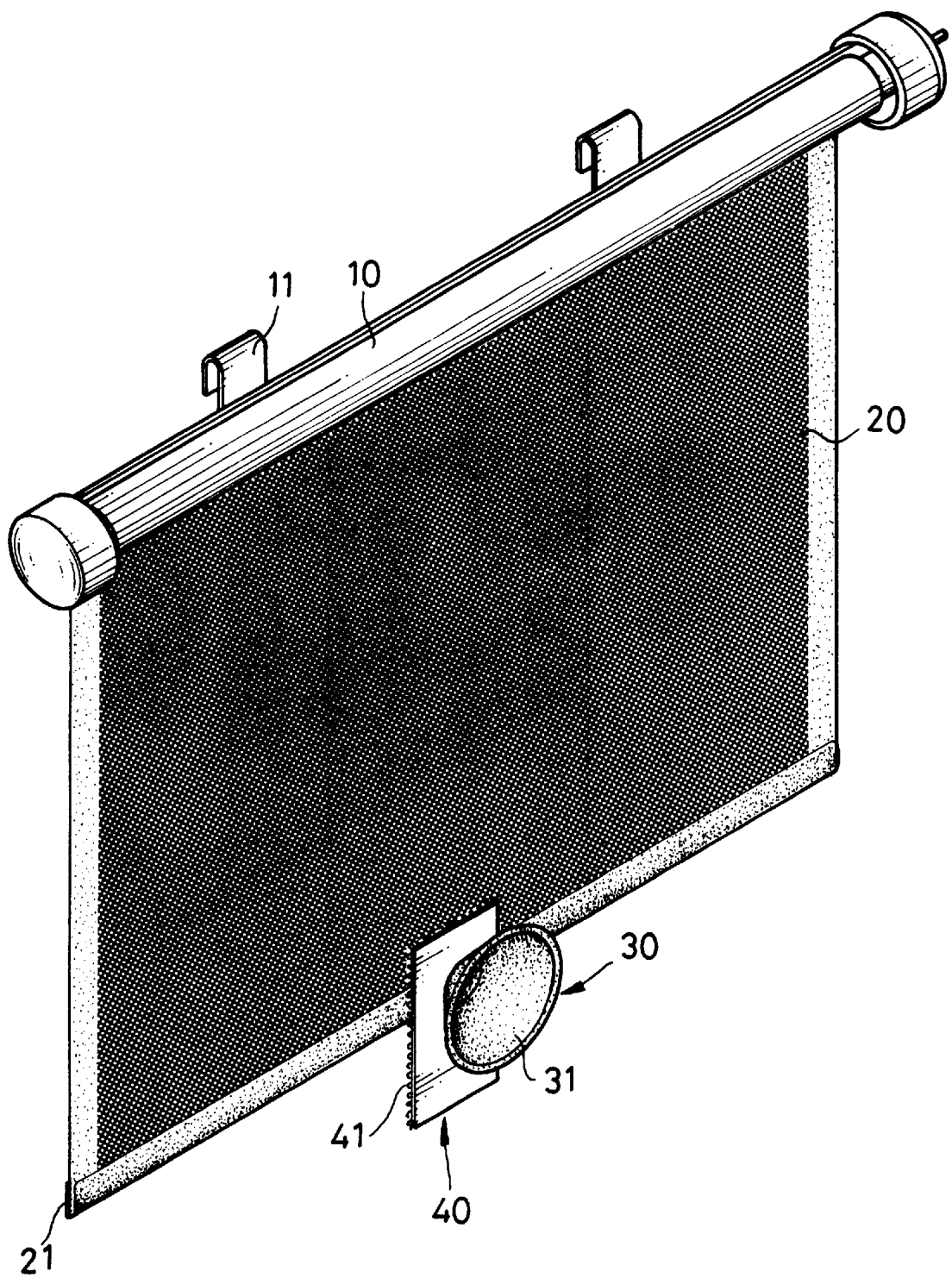
FIG. 1 is a perspective view of a sun visor in accordance with the present invention.
Figure 2:
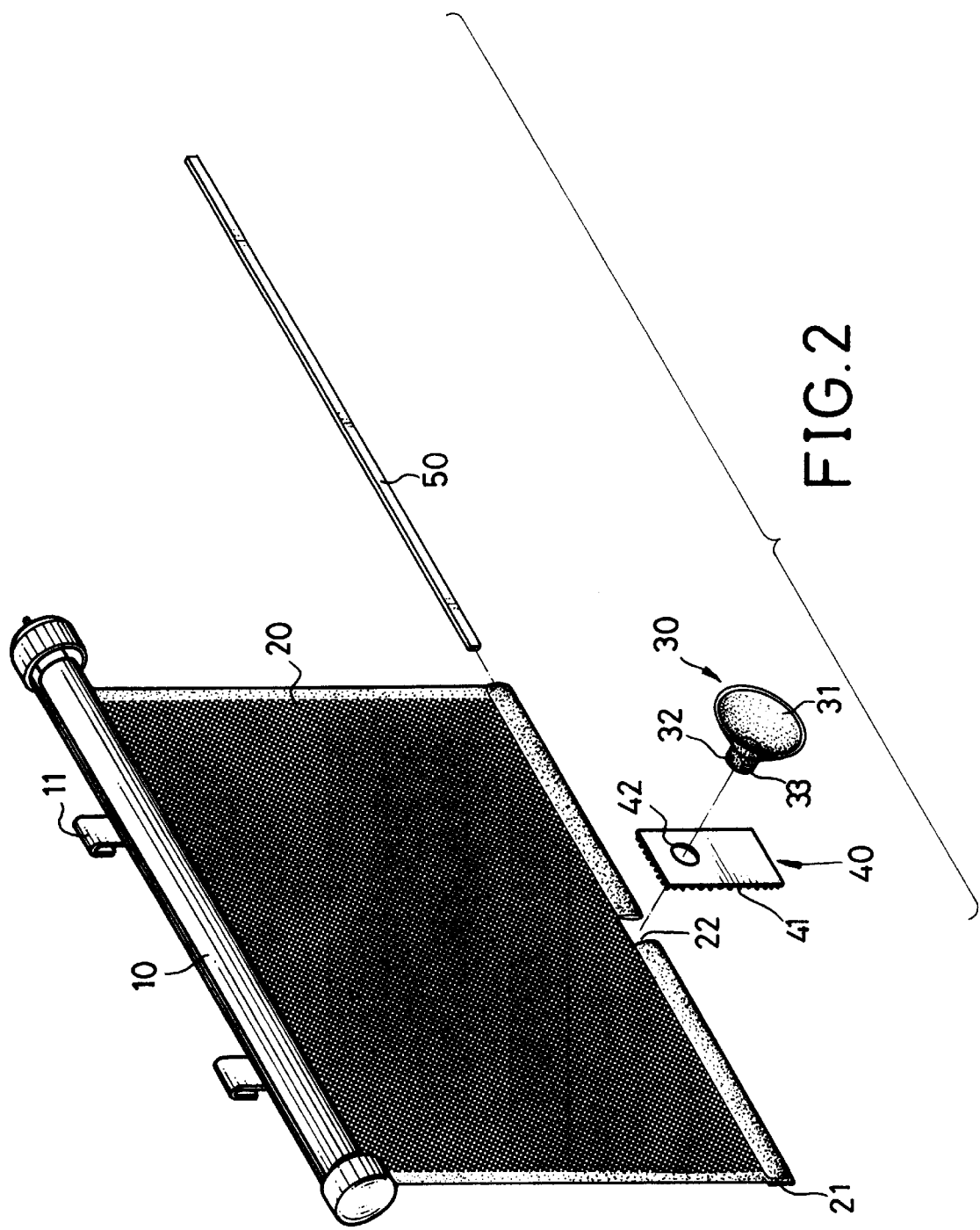
FIG. 2 is an exploded view of the sun visor in accordance with the present invention.

Referring to FIGS. 1 and 2, a sun visor of the present invention comprises a reel (10) and two hooks (11) provided on the periphery thereof to fix the reel (10) in a vehicle. A curtain (20) is wound within the reel (10) and can be extended out in use. A channel (21) is longitudinally defined through the bottom of the curtain (20) and a notch (22) is defined in the middle of the channel (21) thereby separating the channel (21) into two portions.

A sucker (30) and a VELCRO® hook and loop tab (40) are located in the notch (22). The sucker (30) is composed of a suction cup (31) and a protrusion (32) formed on the back of the suction cup (31). An aperture (33) is defined through the protrusion (32). The VELCRO® hook and loop tab (40) comprises a first face with an adhesive tape (41), a second face which is plain and a hole (42) extending between the first and second faces. The protrusion (32) of the sucker (30) is inserted into the hole (42) via the plain face to attach the sucker (30) to the Velcro tab, such that the aperture (33) is accessible. The first face of the VELCRO® hook and loop tab (40) and the suction cup (31) face in opposite directions.

A bar (50) extends along the length of the channel (21) and through the aperture (33) of the sucker (30) at the notch (22) to pivotally mount the sucker (30), as well as the Velcro tab (40), on the curtain (20). Therefore, a user can select either the sucker (30) or the Velcro tab (40) to to retain the curtain (20) at a desired position.

Figure 3:
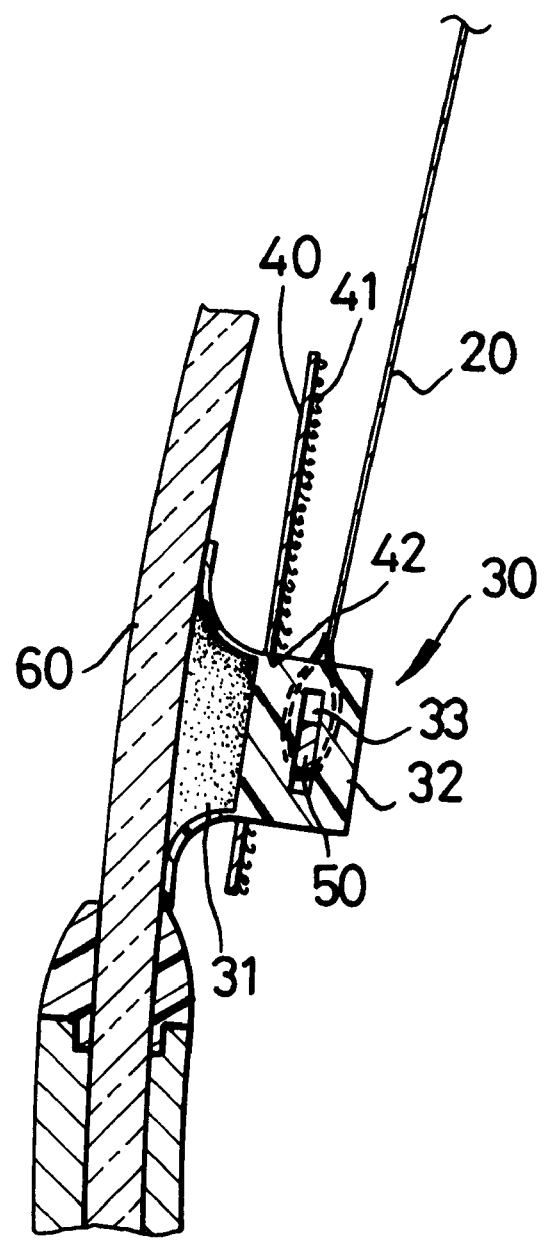
FIG. 3 is a view showing the sun visor being retained in position by a sucker.
Figure 4:
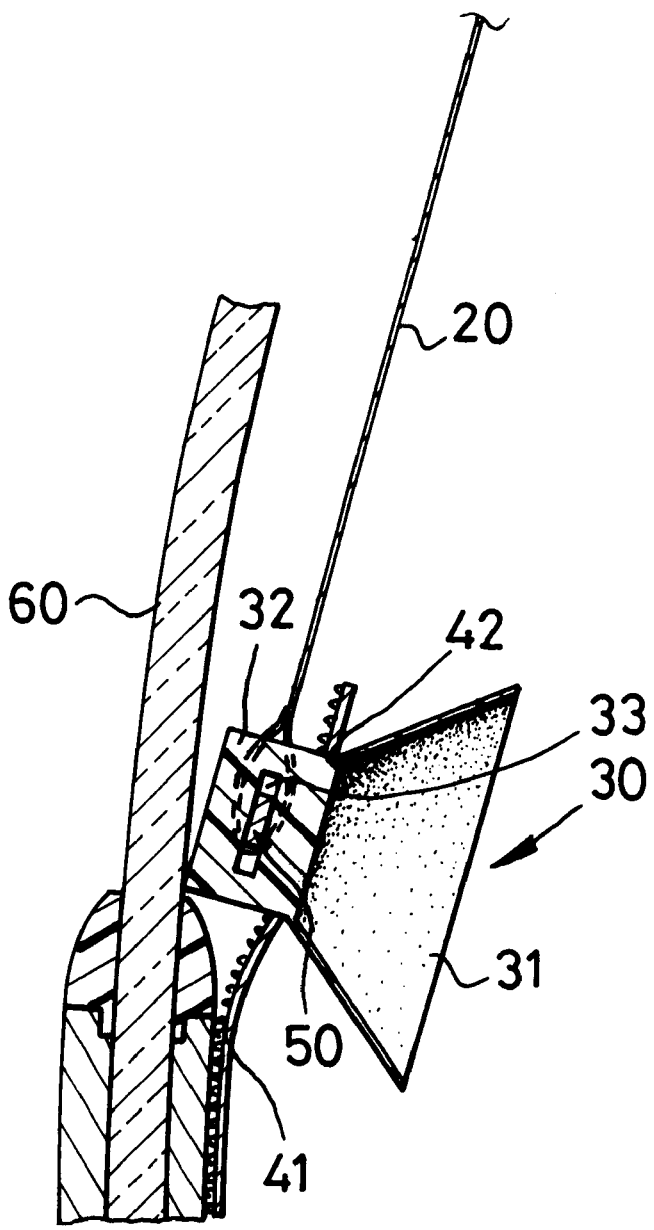
FIG. 4 is a view showing the sun visor being retained in position by a VELCRO® hook and loop tab.
Figure 5:
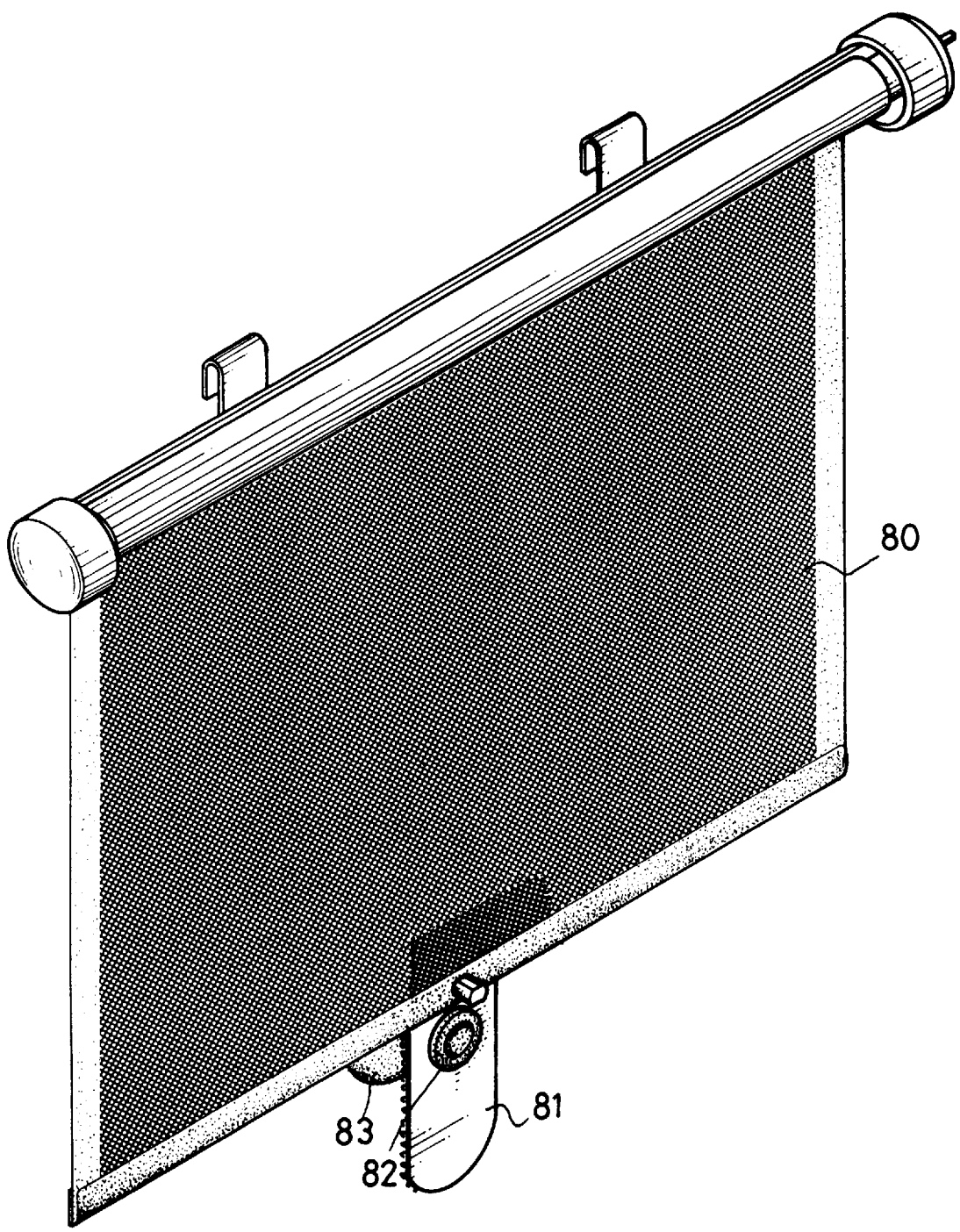
FIG. 5 is a perspective view of a conventional sun visor.
Figure 6:
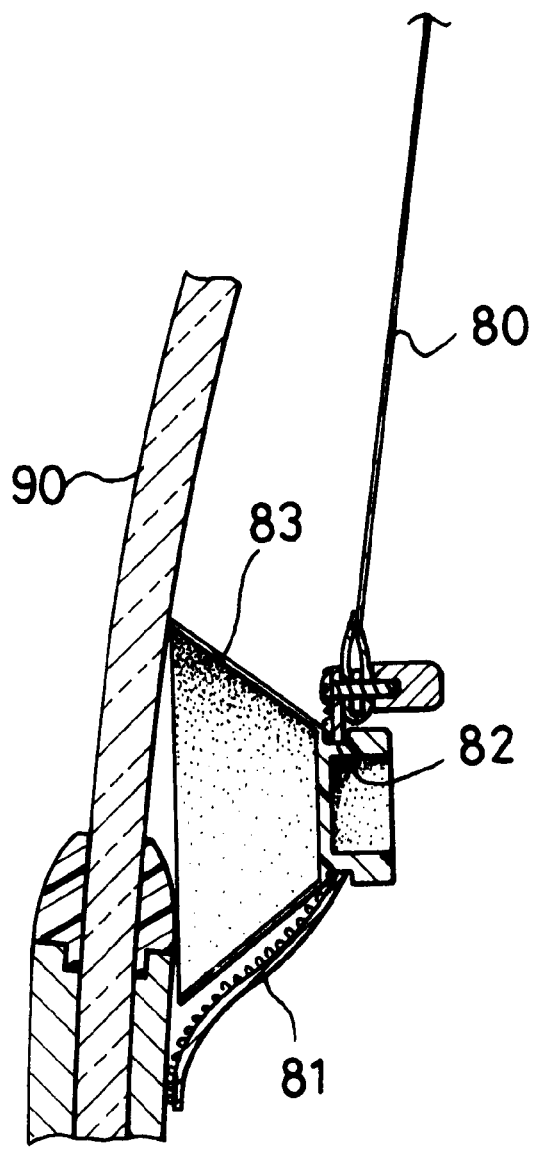
FIG. 6 is a view showing the sun visor being retained in position by a Velcro tab.

FIG. 3 shows the sun visor is adhered to a windshield (60) by the sucker (30). The sucker (30) is turned to make the suction cup (31) face the windshield (60) so it can be adhered thereto. In this arrangement the VELCRO® hook and loop tab (40) is located between the curtain (20) and the windshield (60), and the adhesive tape (41) faces the curtain (20). When a user wants to retain the sun visor by using the VELCRO® hook and loop tab (40), as shown in FIG. 4, the sucker (30) is turned away from the windshield (60) to make the adhesive tape (41) face the windshield (60) and adhere to a a corresponding VELCRO® hook and loop tab (not shown nor numbered) provided below the windshield (60). In this arrangement the suction cup (31) faces the inside of the automobile and will not interfere in the adherence of the VELCRO® hook and loop tab (40).

From the above description, the invention has the following advantages:

1. The sucker (30) and the VELCRO® hook and loop tab (40) are provided on the bottom of the curtain (20) and face in opposite directions so that they will not interfere with each other when the curtain is retained by either the sucker (30) or the VELCRO® hook and loop tab (40).

2. The sucker (30) does not need to be detached and will not be lost.

3. It is convenient for a user to select the sucker (30) or the VELCRO® hook and loop tab (40) to the curtain (20) because the sucker (30) is rotatable.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A sun visor comprising:

a reel having at least one hook formed on the periphery of the reel for retaining the reel on a windshield;

a curtain extensibly wound within the reel and having a channel longitudinally defined along the bottom thereof and a notch defined in the channel;

a sucker located at the notch and having a suction cup, a protrusion formed on the back of the suction cup and an aperture defined in the protrusion;

a hook and loop tab having an adhesive tape formed on a first face, a plain second face and a hole defined therein, wherein the protrusion of the sucker is inserted into the hole via the plain second face and the aperture is extended out of from the hole; and a bar inserted into the channel, and at the notch through the aperture to adjustably mount the sucker and the hook and loop tab on the curtain, whereby a user can select the sucker or the hook and loop tab to fix the curtain on the windshield.

2. The sun visor as claimed in claim 1, wherein the suction cup of the sucker and the first face of the hook and loop tab face in opposite directions.

* * * * *